United States Patent [19]

Day

[11] Patent Number: 4,877,051

[45] Date of Patent: Oct. 31, 1989

[54] FLOW CONTROLLER

[75] Inventor: Christopher C. Day, Newtonville, Mass.

[73] Assignee: MKS Instruments, Inc., Andover, Mass.

[21] Appl. No.: 277,030

[22] Filed: Nov. 28, 1988

[51] Int. Cl.$^4$ ............................................. G05D 7/06
[52] U.S. Cl. .................................. 137/486; 137/487.5
[58] Field of Search .............................. 137/486, 487.5

[56] References Cited

U.S. PATENT DOCUMENTS

| | | | |
|---|---|---|---|
| 3,552,428 | 1/1971 | Pemberton | 137/486 |
| 4,417,312 | 11/1983 | Cronin | 137/487.5 X |
| 4,665,938 | 5/1987 | Brown | 137/487.5 X |
| 4,720,807 | 1/1988 | Ferran | 364/558 |
| 4,724,865 | 2/1988 | Hirano | 137/486 |

Primary Examiner—Alan Cohan

[57] ABSTRACT

A fluid flow control apparatus including a fluid flow control valve, a fluid flow sensor, and a fluid flow control circuit receiving a signal from the fluid flow sensor and outputting a signal to the fluid flow control valve. The fluid flow control circuit including an actual control circuit which outputs a signal related to the comparison of an actual flow signal and a desired flow signal, a desired flow comparator circuit which outputs a signal based on the comparison of the desired flow signal with a desired flow threshold signal, and a summing circuit which receives the outputs and provides a control signal based on these outputs.

17 Claims, 3 Drawing Sheets

FLOW CONTROLLER

BACKGROUND OF THE INVENTION

The present invention relates to fluid flow controllers.

Fluid flow controllers may be used in systems which control flow of fluids (e.g., gases) by sealing and unsealing a valve in a fluid path. In these systems, flow valves modulate fluid flow by adjusting the gap of an orifice. When the fluid flow required is zero, a positive pressure, i.e., a preload, is applied to the seal, e.g., to ensure its integrity against surface imperfections and positive line pressure increases that tend to open the valve.

It is known to utilize integrators to control flow valves. These integrators steadily increase or decrease a control signal, which controls the output power applied to he control valve, based on a constant difference between a set point valve, which is based on desired flow, and an actual flow valve, which is based on the actual flow. Thus, flow through the valve equals the desired flow over time. Because the valve has a preload to ensure the seal, when a set point is commanded, the output power has to ramp from zero to an amount necessary to overcome the sealing preload before the valve begins to open.

It is known to alleviate this problem by providing the controller with a bias adjustment, thus enabling the operator to set the valve to the just closed point before inputting a set point value. It is also known to sense both the flow and the set point and if the flow is zero when the set point is non-zero, to artifically insert a large error signal into the integrator, thus causing the control signal outputted from the integrator to ramp up much faster. This false error signal is removed when the flow sensor detects the onset of fluid flow.

SUMMARY OF THE INVENTION

It has been discovered that a fluid flow control circuit having an actual control circuit which outputs a signal related to the comparison of an actual flow signal and a desired flow signal, a desired flow comparator circuit which outputs a signal based on the comparison of a desired flow with a desired flow threshold signal, and a summing circuit which receives the outputs and provides a control signal based on these outputs, advanatageously provides control of a fluid flow control apparatus having a fluid flow control valve receiving the control signal and a fluid flow sensor inputting the actual flow signal to the fluid flow control circuit.

In preferred embodiments, the fluid flow control apparatus may include a fluid flow control circuit having a sequential logic circuit configured to receive the desired flow comparator output and provide the signal related to the desired flow comparator output, a flow comparator circuit configured to compare the actual flow signal with a flow defining threshold signal and provide a flow comparator output indicative of the comparison, an actual control circuit which includes a subtraction circuit which outputs a signal indicative of the difference between the actual flow signal and the desired flow signal and an integrating circuit which outputs an initial flow control signal which steadily changes based upon a constant difference between the actual flow signal and the desired flow signal, a sequential logic circuit which includes a Set-Reset flip-flop as well as other logic, a fluid flow control circuit which includes an amplifier circuit which outputs an amplified control signal to the fluid flow control valve, a summing circuit which is a duty cycle modulated switching device, an amplifier circuit which includes a switch, a summing circuit and an amplifier circuit which are combined and a combined summing and amplifier circuit which includes a summing amplifier and a linear powered driver.

DESCRIPTION OF THE PREFERRED EMBODIMENT

The drawings are first briefly described.

DRAWINGS

STRUCTURE

Figure 1:
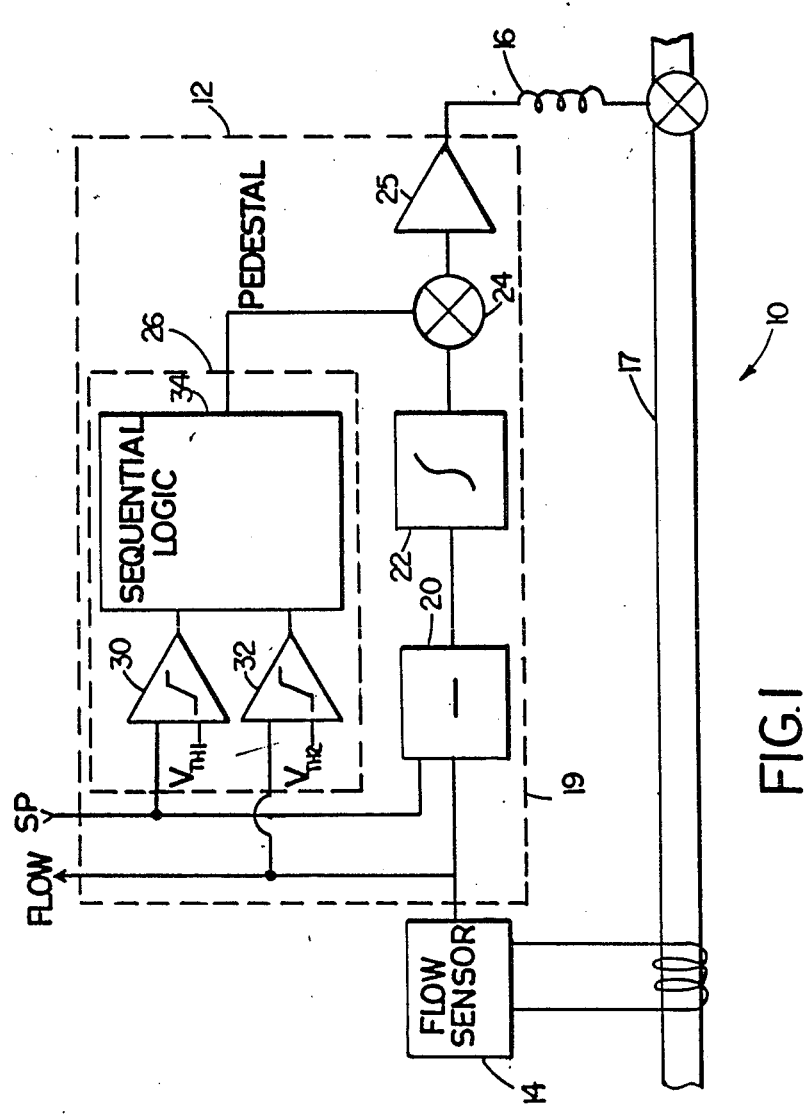
FIG. 1 shows a block diagram of a flow control system according to the present invention.

Referring to FIG. 1, flow control system 10 includes fluid flow control circuit 12 which is inputted with a signal from flow sensor 14 and outputs a control signal to electromagnetic valve 16 which controls flow through flow line 17. The output of flow sensor 14, FLOW, is inputted into subtraction circuit 20 of actual control circuit 19. Subtraction circuit 20 is also inputted with set point signal, SP, which indicates the desired flow of system 10. Actual control circuit 19 also includes integrating circuit 22 into which the output of subtraction circuit 20 is inputted. The output of actual control circuit 19, which is the output of integrating circuit 22, is inputted into summing circuit 24. Summing circuit 24 is also inputted with the output of threshold detection circuit 26. The output of summing circuit 24 is inputted to amplifier circuit 25 which outputs the control signal.

Threshold detection circuit 26 includes desired flow comparator circuit 30 and flow comparator circuit 32 which output signals to sequential logic circuit 34. Sequential logic circuit 34 outputs a pedestal signal, PED, to summing circuit 24. Desired flow comparator 30 is inputted with the set pointn signal SP and a set point defining threshold $V_{TH1}$, i.e., a desired flow threshold signal. Flow comparator 32 is inputted with the flow signal FLOW and a flow defining threshold, $V_{TH2}$.

Figure 2:
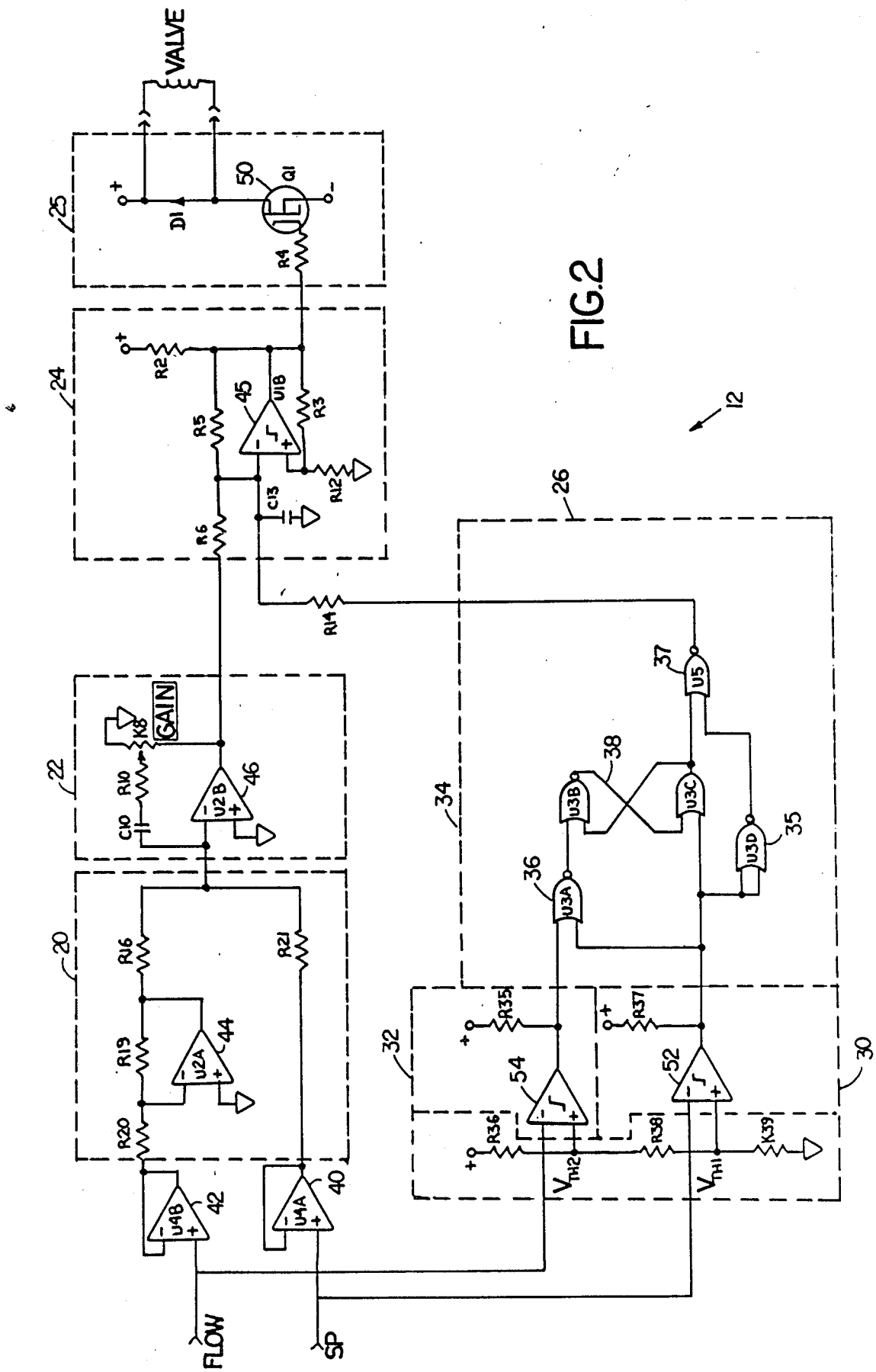
FIG. 2 shows a schematic diagram of the FIG. 1 system.

Refering to FIG. 2., sequential logic circuit 34 includes NOR gate 35, NOR gate 36, NOR gate 37 and Set-Reset flip flop 38, where the output of desired flow comparator 30 is inputted to NOR gate 35, NOR gate 36, and the set input of flip flop 38 and the output of flow comparator 32 is inputted to NOR-gate 36 and the output of NOR gate 36 is inputted to the reset input flip flop 38. The output of flip flop 38 is inputted to NOR gate 37, the output of which is the PED signal. Set-Reset flip flop 38 is a device whose output Q is set to true by a true level or edge on the set input and whose output Q is reset to false by a true level or edge on the reset input. False levels or edges on either input have no effect on the output.

Regarding the remainder of fluid flow control circuit 12, the set point signal and the flow output signal are fed through X 1 buffer circuits 40, 42 respectively. The flow output signal is inputted to operational amplifier 44 which is configured as an inverting amplifier with a gain of one. Thus, when this inverted signal is inputted to integrating circuit 22 it is subtracted from the set point signal which is also inputted into integrating circuit 22. Integrating circuit 22 includes operational amplifier 46 and capacitor C10 which provide the main functional components of integrating circuit 22. Summing circuit 24 includes comparator 48 andn associated resistors and functions as a duty cycle modulated switching device. The output of summing circuit 24 is inputted into amplifier circuit 25 which utilizes field effect transistor (FET) 50 as a switch. Comparator circuit 30 includes comparator 52 and comparator circuit 32 includes comparator 54.

OPERATION

Referring to FIG. 1, control circuit 12 utilizes information received from sensor 14 to control flow control valve 16. More specifically, subtraction circuit 20 acts as an actual flow comparator by detecting the difference between the set point signal, SP, inputted by an operator (not shown) and an actual flow signal, FLOW, which is received from sensor 14, and outputting this difference to integrating circuit 22. In an ideal situation the output of integrating circuit 22 is outputted to amplifier 25 which controls valve 16 according to the output of integrating circuit 22. However, because of the initial preload on valve 16, when valve 16 is closed the output of integrating circuit 22 is insufficient to overcome the preload of valve 16; therefore this signal alone cannot control valve 16. Threshold detection circuit 26 is used to compensate for this preload condition. Threshold detection circuit 26 utilizes inputted thresholds, $V_{TH1}$ and $V_{TH2}$, and the history of system 10, i.e., what system 10 has previously done, to provide a pedestal signal, which is added to the output of integrating circuit 22 at summing circuit 24, and thus control circuit 12 outputs a signal which overcomes the preload of valve 16. Due to the configuration of summing circuit 24 (FIG. 2), both of the inputs to circuit 24 move in a negative direction to initiate flow in system 10.

Figure 3:
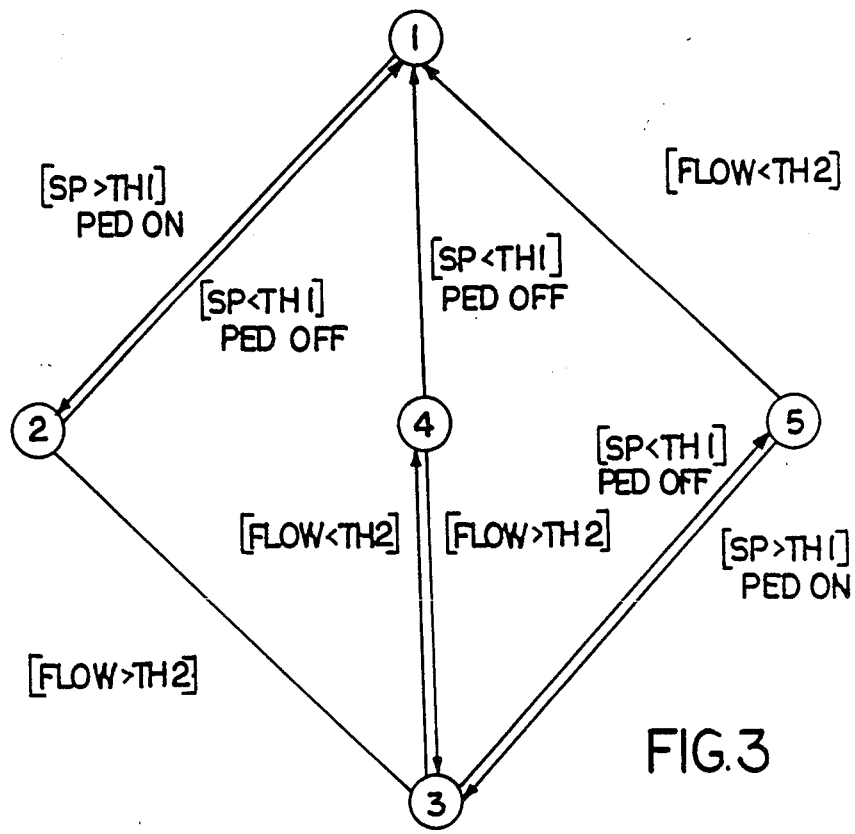
FIG. 3 shows a state diagram of the FIG. 1 system.

Referring to FIGS. 2 and 3, state diagram 80 represents the various states of sequential logic circuit 34 where the numbers and circles represent the various states of system 10, the information in the brackets indicates the event which caused the system to change and the information below the information in brackets is the action to be taken by system 10 on the change of state.

At start up, system 10 is in state one in which the set point equals zero, the flow equals zero and the pedestal signal equals zero. The system is started by increasing the set point to a desired level. The set point is now greater than $V_{TH1}$ and therefore the pedestal signal is turned on, and the system goes to state two. The system goes from state two to state one if the set point drops below $V_{TH1}$. This condition indicates that the SP signal was probably noise. While in state two, the pedestal signal is left on until the flow signal is greater than $V_{TH2}$, at which point the system goes to state three. While in state three, if FLOW drops below its threshold, $V_{TH2}$, then system 10 goes to state four, at which point, no action is taken, i.e., system 10 still functions when flow is below the minimum flow threshold. This state is reversible, i.e., if the flow is greater than the threshold $V_{TH2}$ then the machine returns to state three. However, if, while in state four, the set point drops below the threshold $V_{TH1}$, the pedestal signal is removed and the system returns to state one. If the system is in state three and the set point drops below $V_{TH1}$, then the system goes to state five, at which point the pedestal signal is turned off; if, while in state five, the set point becomes greater than $V_{TH1}$ then the system returns to state three and the pedestal signal is turned on. However, if, while in state five the flow drops below the flow threshold, $V_{TH2}$, then the system returns to state one i.e, the system is turned off.

OTHER EMBODIMENTS

Figure 4:
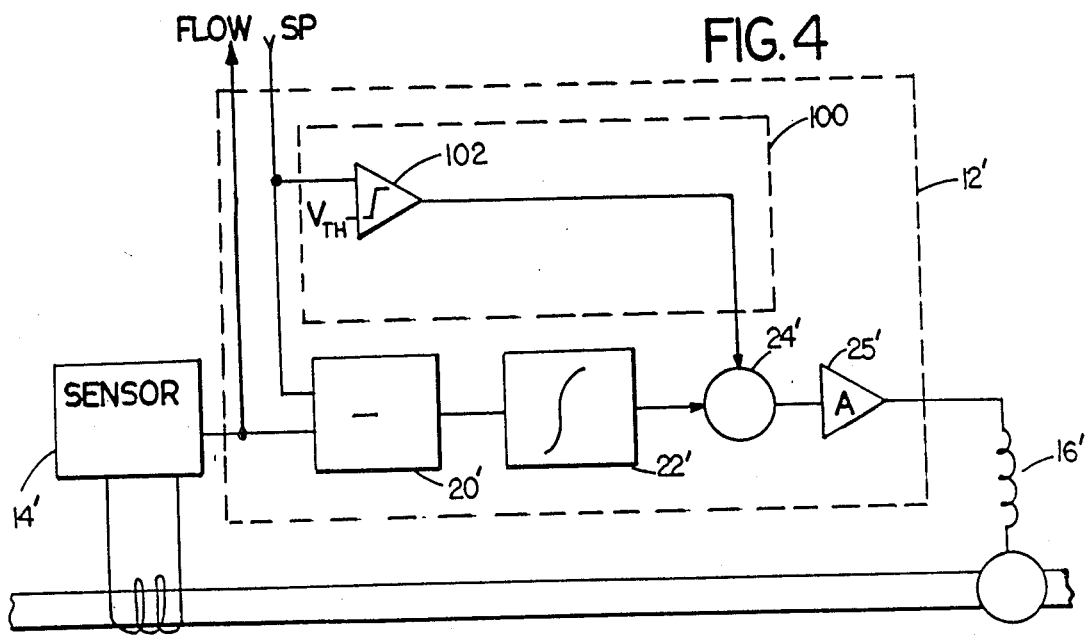
FIG. 4 shows a block diaagram of an alternate system according to the present invention.

Other embodiments are within the following claims. E.g., FIG. 4 shows flow control system 10' having flow circuit 12', flow sensor 14' and flow control valve 16'. Flow control circuit 12' includes subtraction circuit 20', integrator circuit 22', summing circuit 24' and amplifier 25'. Threshold detection circuit 100 includes desired flow comparator circuit 102 which is inputted with a set point voltage and a threshold voltage. The output of comparator 102 is inputted to summing circuit 24, which is located downstream of integrating circuit 22'. Because the pedestal signal is added to the signal outputted from integrator circuit 22, the pedestal signal does not have to be integrated by integrator circuit 22'. Thus, this embodiment advantageously reduces delay in obtaining a signal to open valve 16'.

Additionally, the same logical functions can be realized using different types of logic elements; all combinations of logical elements which produce the states of state diaagram 80 can be considered as alternate embodiments of the present invention.

Additionally, summing circuit 24 and amplifier circuit 25 can include a summing amplifier and a linear powered driver.

What is claimed is:

1. A fluid flow control apparatus comprising
    a fluid flow control valve being configured to be located in a fluid path and controlled by a control signal,
    a fluid flow sensor, said fluid flow sensor configured to sense fluid flow in the fluid path, and output an actual flow signal indicative thereof, and
    a fluid flow control circuit,
        said fluid flow control circuit configured to control said fluid flow control valve,
        said fluid flow control circuit including
            an actual control circuit configured to compare said actual flow signal with a desired flow signal and produce a signal related to this comparison,
            a desired flow comparator circuit configured to compare said desired flow signal with a desired flow threshold signal and provide a desired flow comparator output indicative of this comparison, and
            a summing circuit configured to receive said signal related to the comparison of said actual flow signal with said desired flow signal and a signal related to said desired flow comparator output, and provide said control signal based on said signals.

2. The fluid flow control apparatus of claim 1 wherein said fluid flow control circuit further comprises
    a sequential logic circuit configured to receive said desired flow comparator output and provide said signal related to said desired flow comparator output.

3. The fluid flow control apparatus of claim 2, wherein said fluid flow control circuit further comprises a flow comparator circuit configured to compare said actual flow signal with a flow defining threshold signal and provide a flow comparatoro output indicative of the comparison, and wherein said sequential logic circuit is configured to receive said flow comparator output.

4. The fluid flow control apparatus of claim 1 wherein said actual control circuit includes a subtraction circuit configured to receive said actual flow signal and said desired flow signal and to output a difference signal indicative of the difference between said actual flow signal and said desired flow signal.

5. The fluid flow control apparatus of claim 1 wherein said actual control circuit includes an integrating circuit configured to receive a signal indicating the difference between said actual flow signal and said desired flow signal and to output an initial flow control signal, said initial flow control signal steadily changing bsed on a constant difference between said actual flow signal and said desired flow signal.

6. The fluid flow control apparatus of claim 3 wherein said sequential logic circuit includes a Set-Reset flip-flop.

7. The fluid flow control apparatus of claim 6 wherein said sequential logic circuit includes a NOR gate, said NOR gate being inputted with the output of said desired flow comparator and said flow comparator, said NOR gate outputting a signal to the Reset input of said Set-Reset flip flop 8. The fluid flow control apparatus of claim 7 wherein said sequential logic circuit includes a second NOR gate, said second NOR gate being inputted with the output of said desired flow comparator, the output of desired flow comparator also being iputted to the Set input of said Set-Reset flip flop 9. The fluid flow control apparatus of claim 8 wherein said sequential logic circuit further includes a third NOR gate, said third NOR gate receiving the output of said Set-Reset flip-flop and the output of said second NOR gate and outputting said signal related to said desired flow comparator output.

10. The fluid flow control apparatus of claim 1 wherein said fluid flow control circuit further comprises an amplifier circuit configured to receive said control signal and output an amplified control signal to said fluid flow control valve.

11. The fluid flow control apparatus of claim 10 wherein said summing circuit includes a duty cycle modulated switching device and said amplifier circuit includes a switch.

12. The fluid flow control apparatus of claim 10 wherein said summing circuit and said amplifier circuit are combined.

13. The fluid flow control apparatus of claim 12 wherein said combined summing and amplifier circuit include a summing amplifier and a linear powered driver.

14. A method of controlling flow through a fluid path in a system having a fluid flow control valve and a fluid flow sensor comprising sensing fluid flow through said fluid path with said fluid flow sensor and providing an actual flow signal indicative thereof, comparing said actual flow signal with a desired flow signal and providing a signal related to this comparison, comparing said desired flow signal with a desired flow threshold signal and providing a desired flow compare output indicative thereof, summing said signal related to the comparison of said actual flow signal with said desired flow signal and a signal related to said desired flow compare output to provide a control signal, and controlling flowo through said fluid path based on said control signal.

15. The fluid flow control apparatus of claim 1 wherein said signal related to said desired flow comparator output is said desired flow comparator output.

16. The method of claim 14 further comprising, providing said signal related to said desired flow compare output by a sequential logic circuit, said sequential logic circuit being inputted with said desired flow compare output.

17. The method of claim 14 wherein said signal related to said desired flow compare output is said desired flow compare output.

* * * * *

UNITED STATES PATENT AND TRADEMARK OFFICE
CERTIFICATE OF CORRECTION

PATENT NO. : 4,877,051
DATED : October 31, 1989
INVENTOR(S) : Christopher C. Day It is certified that error appears in the above-identified patent and that said Letters Patent is hereby corrected as shown below:

| | |
|---|---|
| Column 1, line 19, | replace "he" with --the--. |
| Column 2, line 19, | replace "diaagram" with --diagram--. |
| Column 2, line 46, | replace "pointn" with --point--. |
| Column 2, line 50, | replace "Refering" with --Referring--. |
| Column 3, line 5, | replace "andn" with --and--. |
| Column 5, line 3, | replace "comparatoro" with --comparator--. |
| Column 5, line 22 | replace "bsed" with --based--. |
| Column 5, line 42, | replace "iputted" with --inputted--. |
| Column 6, line 36, | replace "flowo" with --flow--. |

Signed and Sealed this

Sixteenth Day of April, 1991

Attest:

HARRY F. MANBECK, JR.

Attesting Officer

Commissioner of Patents and Trademarks